United States Patent
Huang et al.

(10) Patent No.: US 8,553,185 B2
(45) Date of Patent: *Oct. 8, 2013

(54) TRANSFLECTIVE LIQUID CRYSTAL DISPLAY PANEL

(75) Inventors: Kai-Hung Huang, Taipei County (TW); Li-Wen Wang, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 485 days.

This patent is subject to a terminal disclaimer.

(21) Appl. No.: 12/981,502

(22) Filed: Dec. 30, 2010

(65) Prior Publication Data

US 2012/0038869 A1    Feb. 16, 2012

(30) Foreign Application Priority Data

Aug. 10, 2010  (TW) .................................. 099126601

(51) Int. Cl.
G02F 1/1335    (2006.01)
(52) U.S. Cl.
USPC .......................................................... 349/114
(58) Field of Classification Search
None
See application file for complete search history.

(56) References Cited

U.S. PATENT DOCUMENTS

| | | | |
|---|---|---|---|
| 6,654,076 B2 * | 11/2003 | Ha et al. ........................... | 349/43 |
| 7,245,335 B2 | 7/2007 | Watanabe | |
| 7,450,200 B2 * | 11/2008 | Park et al. ..................... | 349/114 |
| 8,318,517 B2 * | 11/2012 | Huang et al. .................... | 438/30 |
| 2003/0081159 A1 | 5/2003 | Ha | |
| 2006/0132682 A1 * | 6/2006 | Yang et al. ..................... | 349/114 |
| 2007/0242196 A1 | 10/2007 | Yoshida | |
| 2008/0151156 A1 | 6/2008 | Ino | |
| 2009/0066868 A1 * | 3/2009 | Kim et al. ....................... | 349/38 |
| 2009/0302318 A1 * | 12/2009 | Chang ............................ | 257/59 |

FOREIGN PATENT DOCUMENTS

| | | |
|---|---|---|
| CN | 1417622 A | 5/2003 |
| CN | 1790145 A | 6/2006 |
| TW | 577107 | 2/2004 |
| TW | 200837467 | 9/2008 |
| TW | 200952088 | 12/2009 |

OTHER PUBLICATIONS

Kai-Hung Huang et al., Title: Method of Manufacturing Transflective Liquid Crystal Display Panel, pending U.S. Appl. No. 12/981,491, Filing date: Dec. 30, 2010.

* cited by examiner

*Primary Examiner* — Michelle R Connelly
(74) *Attorney, Agent, or Firm* — Winston Hsu; Scott Margo (57) ABSTRACT

A transflective liquid crystal display panel includes a substrate, a gate electrode, a reflective electrode, a first insulating layer, a patterned semiconductor layer, a source electrode, a drain electrode, a patterned reflective layer, a second insulating layer, and at least a transmissive pixel electrode. The gate electrode and the reflective electrode are both formed by a first patterned conductive layer, and the source electrode, the drain electrode, and the patterned reflective layer are both formed by a second patterned conductive layer. Furthermore, a plurality of contact holes are formed in the first insulating layer and the second insulating layer. Moreover, the transmissive pixel electrode is filled into the contact holes to be electrically connected with the drain electrode, the reflective electrode, and the patterned reflective layer, respectively.

4 Claims, 11 Drawing Sheets

TRANSFLECTIVE LIQUID CRYSTAL DISPLAY PANEL

BACKGROUND OF THE INVENTION

1. Field of the Invention

The present invention relates to a transflective liquid crystal display panel, and more particularly, to a transflective liquid crystal display panel that requires fewer photomask processes.

2. Description of the Prior Art

According to different designs of light source, liquid crystal display panels may be divided into three kinds, which are transmissive liquid crystal display panels, reflective liquid crystal display panels, and transflective liquid crystal display panels. Combining the advantages of the transmissive liquid crystal display panel and the reflective liquid crystal display panel, the display quality of the transflective liquid crystal display panel may be ensured in both outdoor environments with strong ambient light and indoor environments. Conventional structure of the transflective liquid crystal display panel is disclosed in U.S. Pat. No. 7,245,335. For providing a reflection effect, at least a photomask process is required to make a reflective metal layer. Additionally, an extra photomask process is needed to make reflective bumps for enhancing the reflection effect. Accordingly, more manufacturing processes are required to make the transflective liquid crystal display panel compared to the manufacturing processes of the transmissive liquid crystal display panel.

More specifically, at least eight photomask processes are generally required in a conventional manufacturing process of the transflective liquid crystal display panel. For example, to make the transflective liquid crystal display panel, a first photomask process is used to make gate electrodes, a second photomask process is used to make a semiconductor layer, a third photomask process is used to make source electrodes and drain electrodes, a fourth photomask process is used to make pixel electrodes, a fifth photomask process is used to make resin opens, a sixth photomask process is used to make resin bumps, a seventh photomask process is used to make contact holes, and an eighth photomask process is used to make reflective electrodes. Each of the photomask processes comprises many steps, such as depositing, cleaning, photoresist coating, photo exposure, developing, etching, photoresist stripping, and inspecting. Therefore, there are problems with the conventional transflective liquid crystal display panel, such as complicated processes, high manufacturing costs, and low yields.

SUMMARY OF THE INVENTION

It is one of the objectives of the present invention to provide a transflective liquid crystal display panel to solve the above-mentioned problems of the prior art.

According to a preferred embodiment of the present invention, a transflective liquid crystal display panel comprises: a substrate, a first patterned conductive layer, a first insulating layer, a patterned semiconductor layer, a second patterned conductive layer, a second insulating layer, and at least a transmissive pixel electrode. The substrate comprises at least a pixel area, and the pixel area comprises a device area, a transmissive area, and a reflective area. The first patterned conductive layer is disposed on the substrate, wherein the first patterned conductive layer comprises at least a gate electrode and a reflective electrode. The gate electrode is disposed in the device area, and the reflective electrode is disposed in the reflective area. The first insulating layer is disposed on the first patterned conductive layer and the substrate. The patterned semiconductor layer is disposed on the first insulating layer, and the patterned semiconductor layer is substantially corresponding to the gate electrode. The second patterned conductive layer is disposed on the first insulating layer and the patterned semiconductor layer, wherein the second patterned conductive layer comprises at least a source electrode, a drain electrode, and a patterned reflective layer. The source electrode and the drain electrode are disposed in the device area, and the patterned reflective layer is disposed in the reflective area. The second insulating layer is disposed on the second patterned conductive layer and the first insulating layer, wherein the second insulating layer has a first contact hole to expose a part of the drain electrode, the second insulating layer and the first insulating layer have a second contact hole to expose a part of the reflective electrode, and the second insulating layer has a third contact hole to expose a part of the patterned reflective layer. In addition, the transmissive pixel electrode is disposed on the second insulating layer, wherein the transmissive pixel electrode is disposed in the transmissive area, in a part of the reflective area, and in a part of the device area. The transmissive pixel electrode is filled into the first contact hole, the second contact hole, and the third contact hole, to be electrically connected respectively with the drain electrode, the reflective electrode, and the patterned reflective layer.

According to the transflective liquid crystal display panel in the present invention, the transflective liquid crystal display panel may be made by normal liquid crystal display panel manufacturing processes, and it needs only five photomask processes. The purposes of process simplification, manufacturing cost down, and yield enhancement may then be achieved.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1A-6 are schematic diagrams illustrating a method of manufacturing a transflective liquid crystal display panel according to a preferred embodiment of the present invention.

DETAILED DESCRIPTION

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." In addition, to simplify the descriptions and make it more convenient to compare between each embodiment, identical components are marked with the same reference numerals in each of the following embodiments. Please note that the figures are only for illustration and the figures may not be to scale.

Figure 1A:
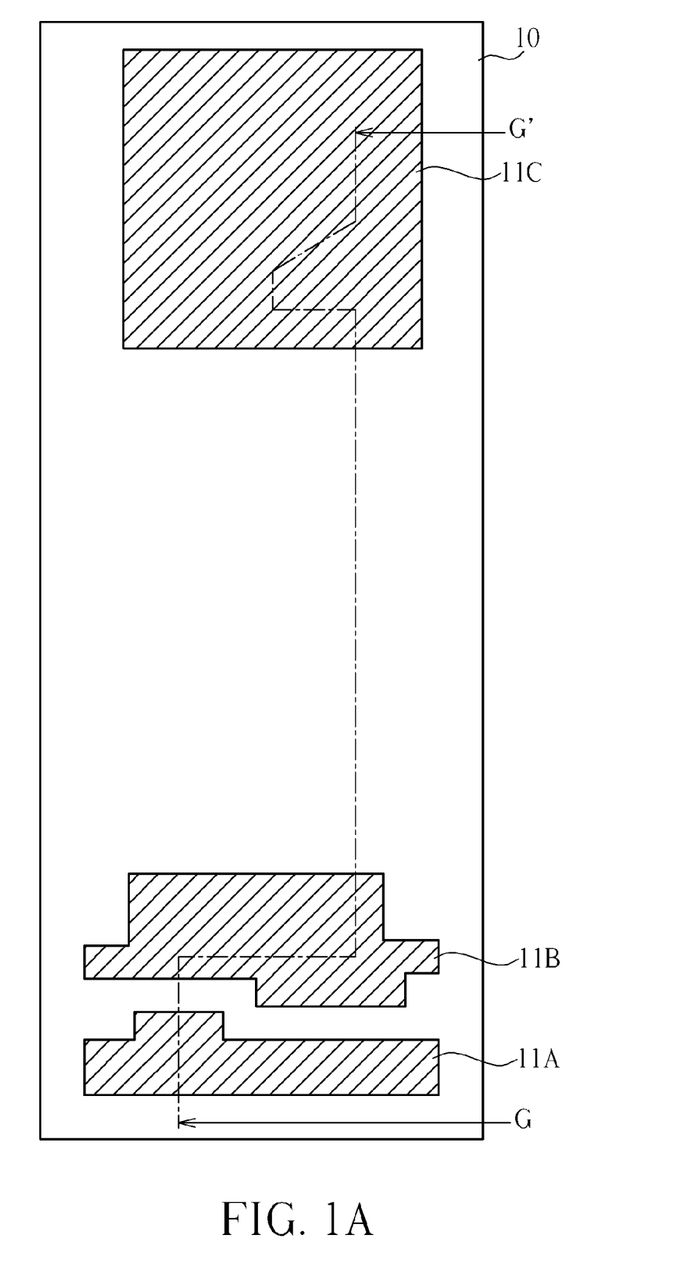
Figure 1B:
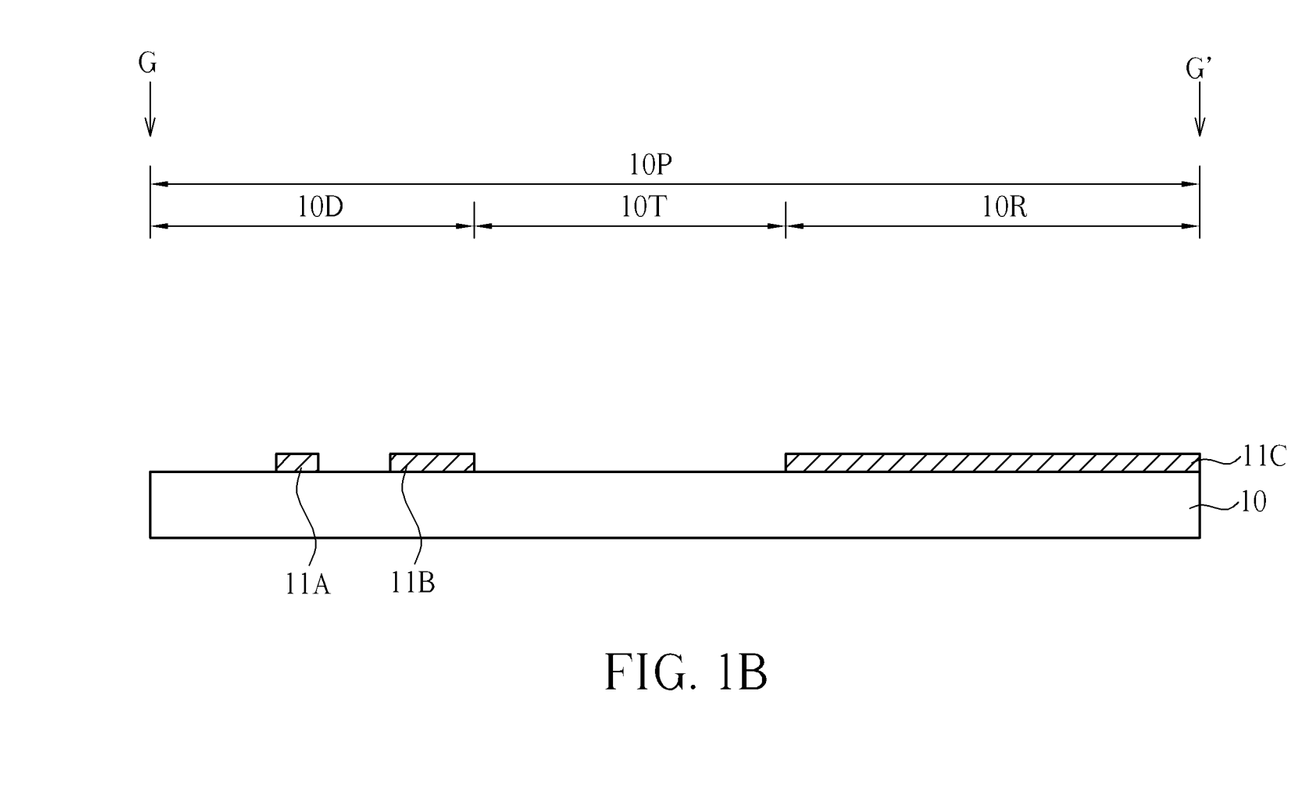

Please refer to FIGS. 1A-6. FIGS. 1A-6 are schematic diagrams illustrating a method of manufacturing a transflective liquid crystal display panel according to a preferred embodiment of the present invention, wherein FIG. 1A is a schematic diagram illustrating a top view of the preferred embodiment, and FIG. 1B is a schematic diagram illustrating a cross-sectional view along the line G-G' in FIG. 1A. As shown in FIG. 1A and FIG. 1B, first of all, a substrate 10 is provided. Material of the substrate 10 may be glass, plastic, or quartz, but the material of the substrate 10 is not limited to these and may include other appropriate materials. The substrate 10 comprises at least a pixel area 10P. The pixel area 10P comprises a device area 10D, a transmissive area 10T, and a reflective area 10R. More specifically, the substrate 10 may comprise a plurality of pixel areas 10P, and each of the pixel areas 10P may comprise a device area 10D, a transmissive area 10T, and a reflective area 10R. To simplify the description, a single pixel area 10P is described. A first patterned conductive layer is formed on the substrate 10 to form a gate electrode 11A in the device area 10D, and to form a reflective electrode 11C in the reflective area 10R. In addition, the first patterned conductive layer may further be used to form a storage capacitance electrode 11B disposed in the device area 10D. The storage capacitance electrode 11B may form a storage capacitor with a transmissive pixel electrode formed subsequently. The storage capacitor may be used to assist in maintaining a voltage difference of each of the pixels during the pixel scanning stage. In other words, the first patterned conductive layer may comprise the gate electrode 11A, the storage capacitance electrode 11B, and a reflective electrode 11C. The first conductive layer may be a metal layer, such as aluminum (Al), chromium (Cr), molybdenum (Mo), tungsten (W), tantalum (Ta), copper (Cu), or an alloy of any of these metals. Or the first conductive layer may be a non-metal conductive layer, such as indium tin oxide (ITO) or zinc oxide (ZnO). A method of forming the first patterned conductive layer may comprise: depositing a first conductive layer (not shown) first, then employing a first photomask (not shown) in a photo etching process to pattern the first conductive layer, and forming the first patterned conductive layer. The present invention is not limited to this, and other appropriate processes may be employed to form the first patterned conductive layer. Accordingly, in this preferred embodiment, only one photomask process is employed to make the gate electrode 11A, the storage capacitance electrode 11B, and the reflective electrode 11C at the same time.

Figure 2A:
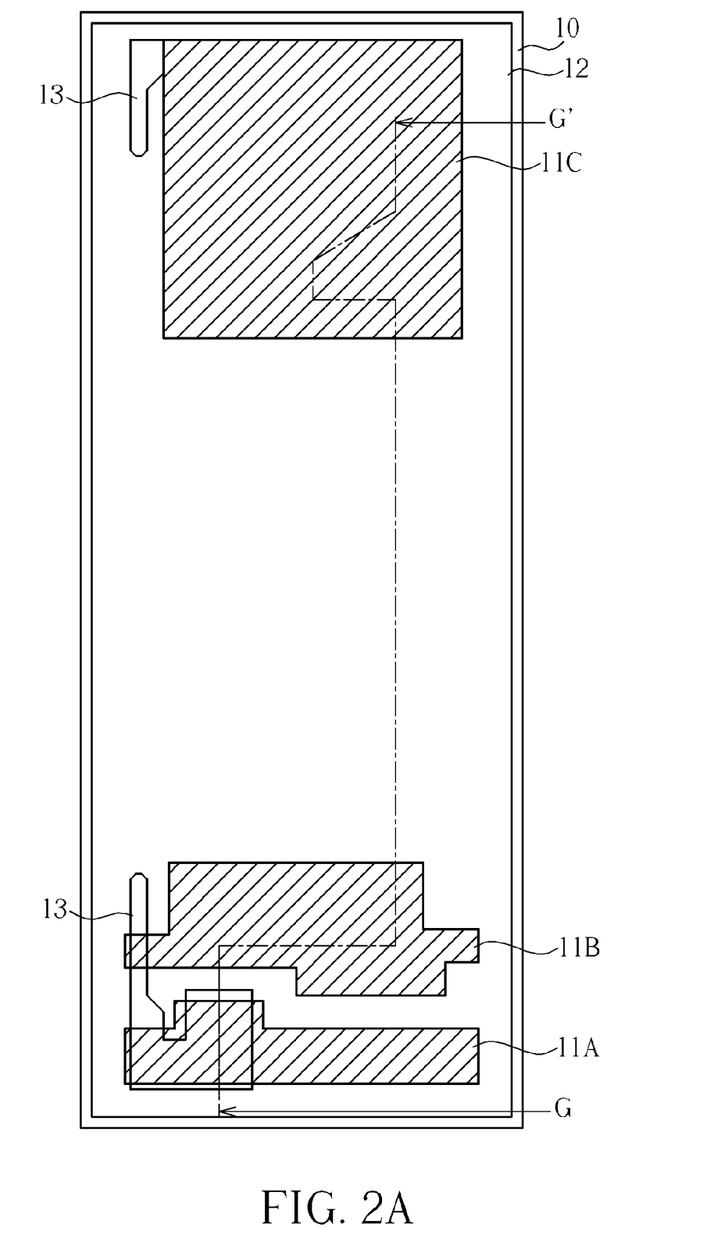
Figure 2B:
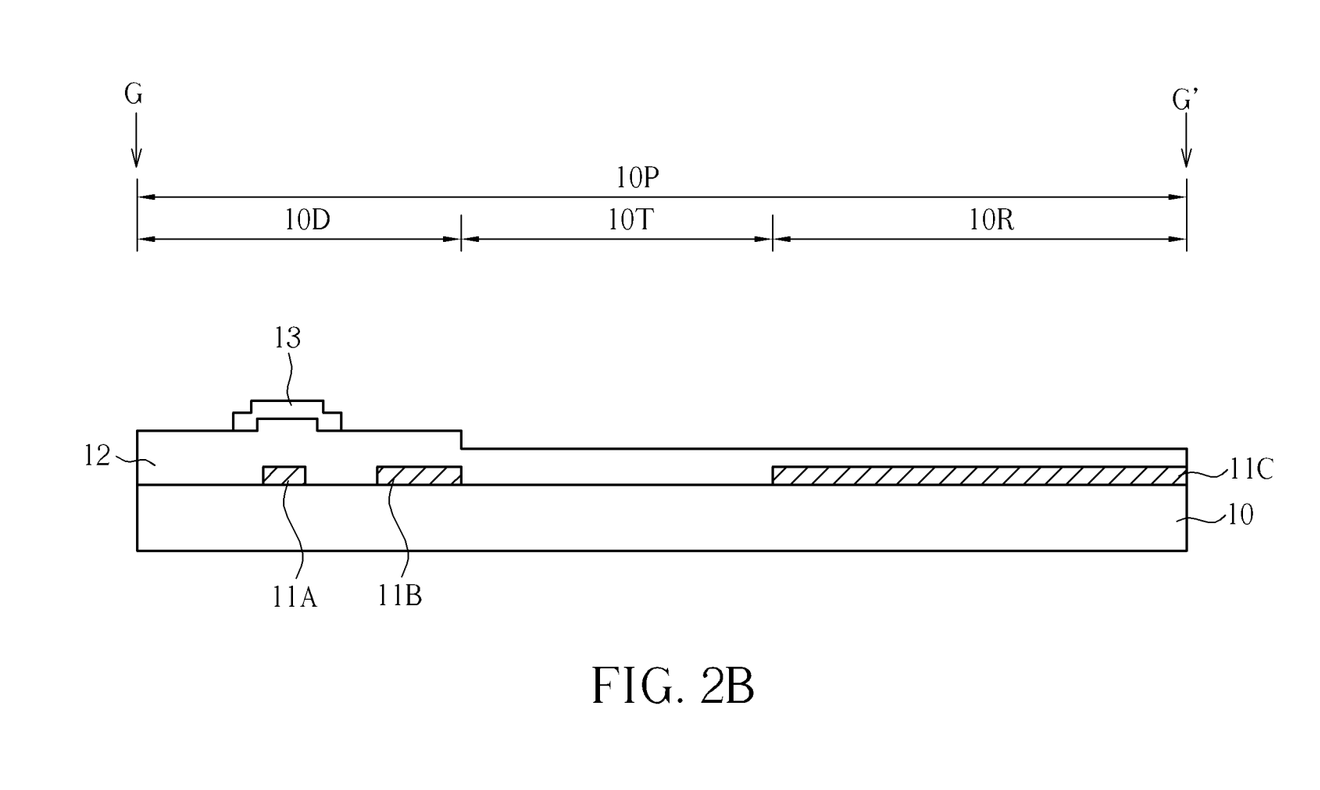

Please refer to FIG. 2A and FIG. 2B. FIG. 2A is a schematic diagram illustrating a top view of the preferred embodiment, and FIG. 2B is a schematic diagram illustrating a cross-sectional view along the line G-G' in FIG. 2A. As shown in FIG. 2A and FIG. 2B, a first insulating layer 12 is formed on the first patterned conductive layer and the substrate 10. The first insulating layer 12 may be a single insulating layer or a composite layer, and the materials of the first insulating layer may include silicon oxide, silicon nitride, or silicon oxynitride, but the present invention is not limited to this. A patterned semiconductor layer 13 is formed on the first insulating layer 12. The patterned semiconductor layer 13 substantially corresponds to the gate electrode 11A. The method of forming the patterned semiconductor layer 13 may comprise: depositing a semiconductor layer (not shown) first, then employing a second photomask (not shown) in a photo etching process to pattern the semiconductor layer, and forming the patterned semiconductor layer 13. The present invention is not limited to this, and other appropriate processes may be employed to form the patterned semiconductor layer 13.

Figure 3A:
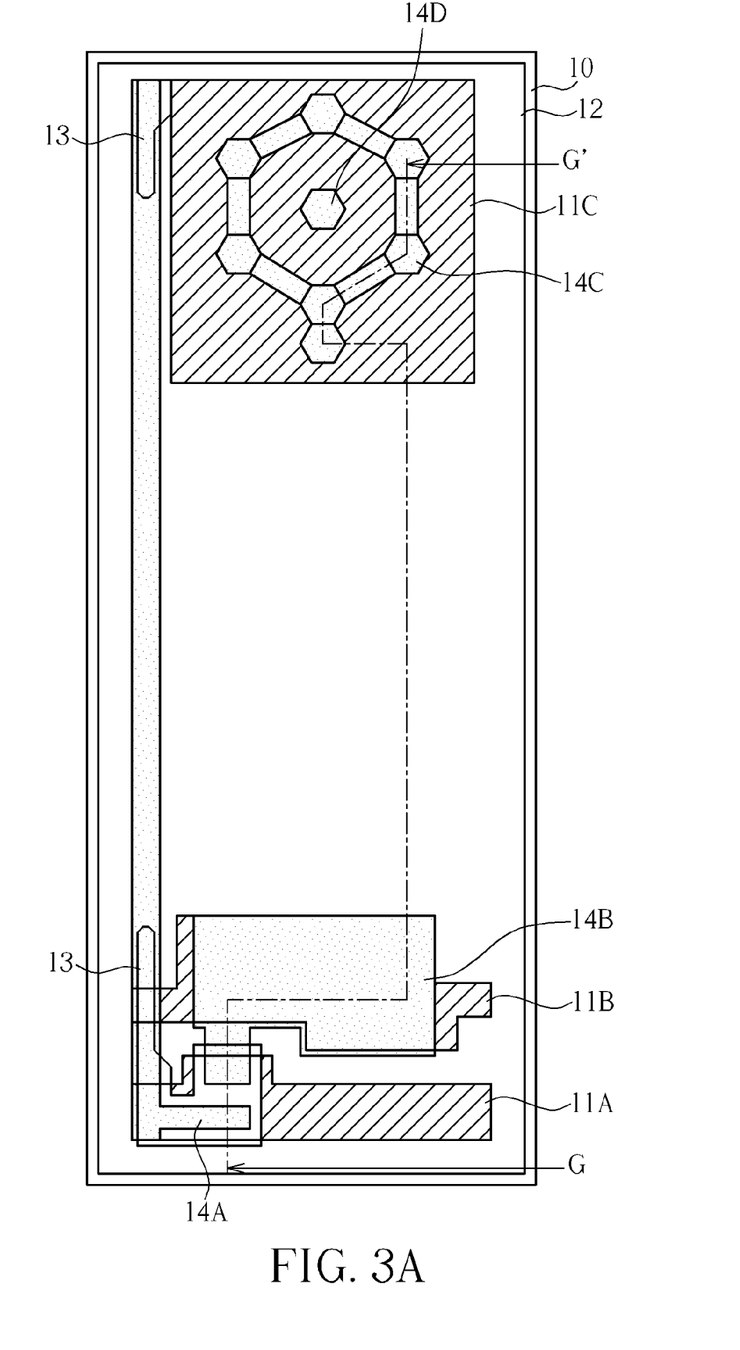
Figure 3B:
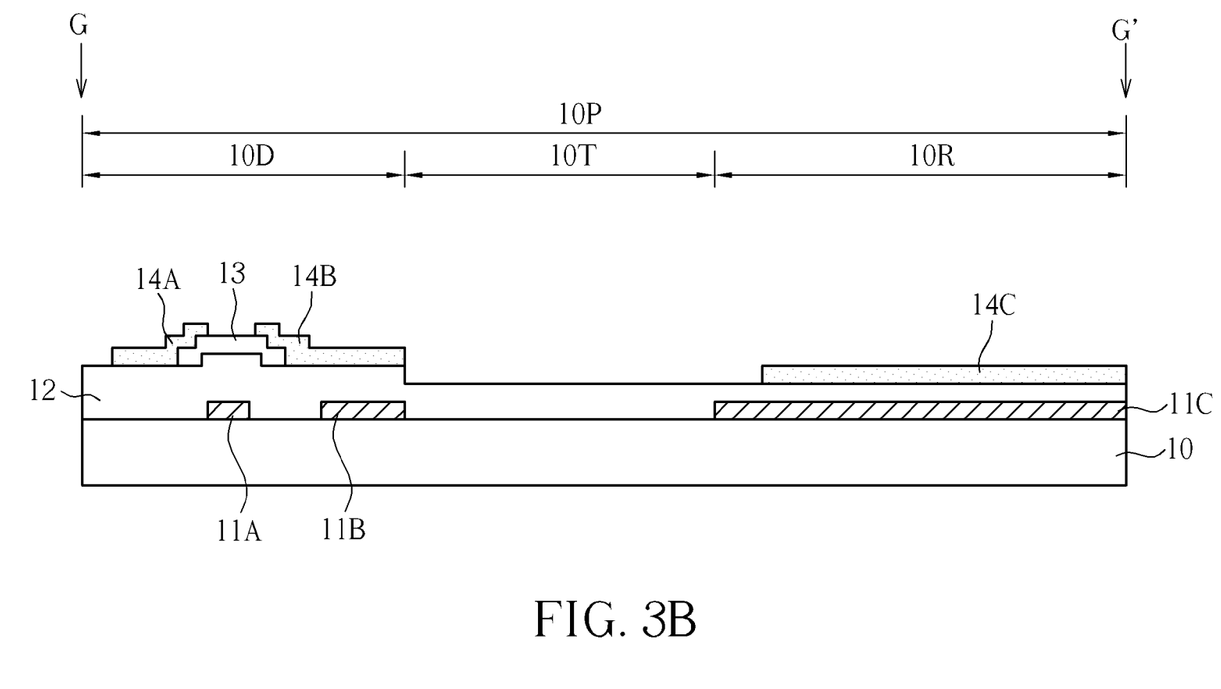

Please refer to FIG. 3A and FIG. 3B. FIG. 3A is a schematic diagram illustrating a top view of the preferred embodiment, and FIG. 3B is a schematic diagram illustrating a cross-sectional view along the line G-G' in FIG. 3A. As shown in FIG. 3A and FIG. 3B, a second patterned conductive layer is formed on the first insulating layer 12 and the patterned semiconductor layer 13, to form a source electrode 14A and a drain electrode 14B in the device area 10D, and to form a patterned reflective layer 14C in the reflective area 10R. The source electrode 14A and the drain electrode 14B substantially correspond separately to two opposite sides of the gate electrode 11A, and the patterned reflective layer 14C comprises a plurality of reflective bumps. In this preferred embodiment, the reflective bumps are electrically connected with each other, for the purpose of electrically connecting each of the bumps to the transmissive pixel electrode formed in the subsequent process. Additionally, the second patterned conductive layer may further comprise at least an isolated bump 14D disposed in the reflective area 10R, and the isolated bump 14D is not electrically connected to the patterned reflective layer 14C. The method of forming the second patterned conductive layer may comprise: depositing a second conductive layer (not shown) first, then employing a third photomask (not shown) in a photo etching process to pattern the second conductive layer, and forming the second patterned conductive layer. The present invention is not limited to this, and other appropriate processes may be employed to form the second patterned conductive layer. It is worthy of note that distribution of the patterned reflective layer 14C and the isolated bump 14D may be modified according to the different product demands. For example, distribution of the patterned reflective layer 14C may be a closed circle for providing reflective sides facing multiple directions and enhancing the reflection effect of the patterned reflective layer 14C. Accordingly, in this preferred embodiment, the photomask process is employed to make the source electrode 14A, the drain electrode 14B, the patterned reflective layer 14C, and the isolated bump 14D at the same time.

Figure 4A:
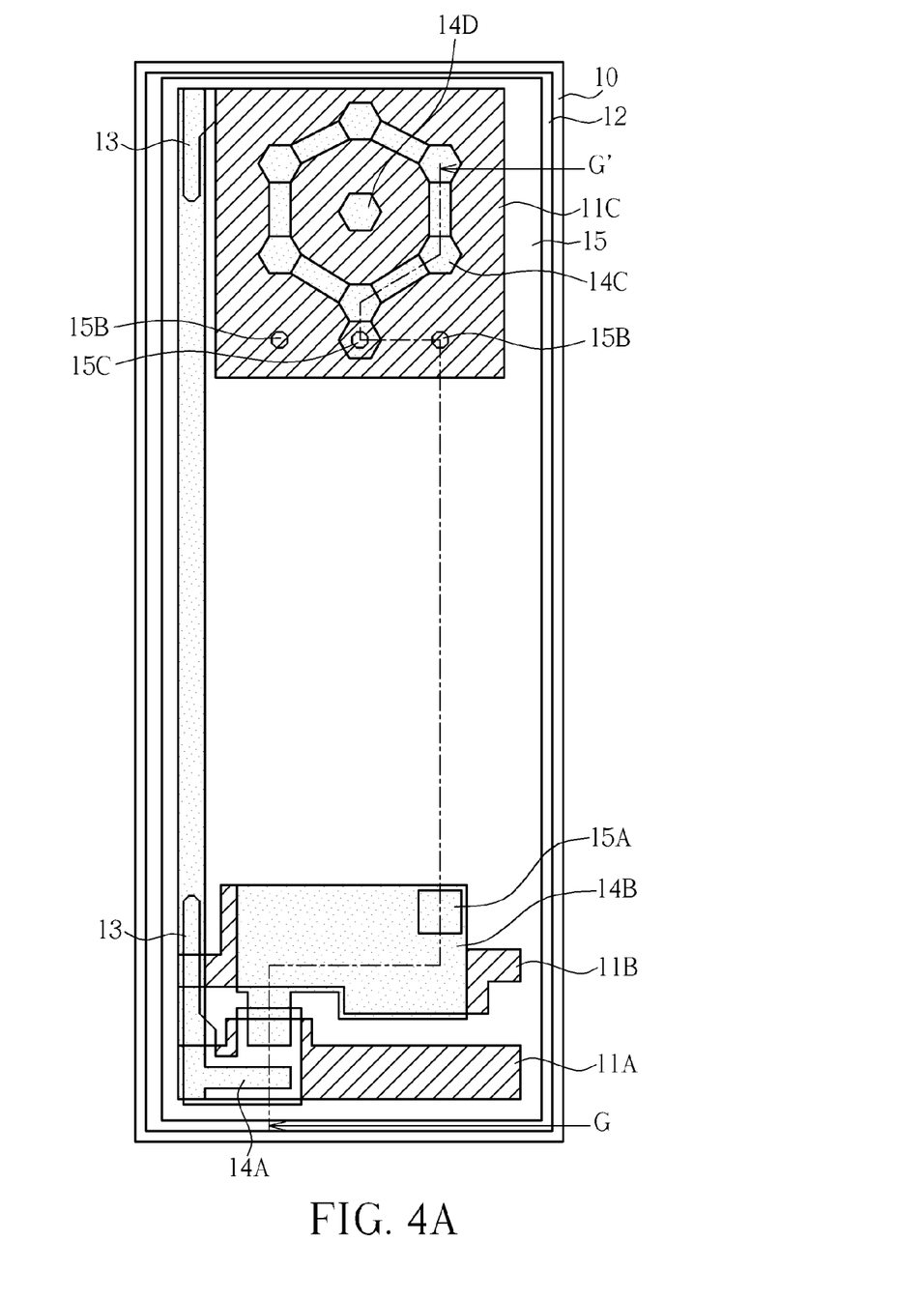
Figure 4B:
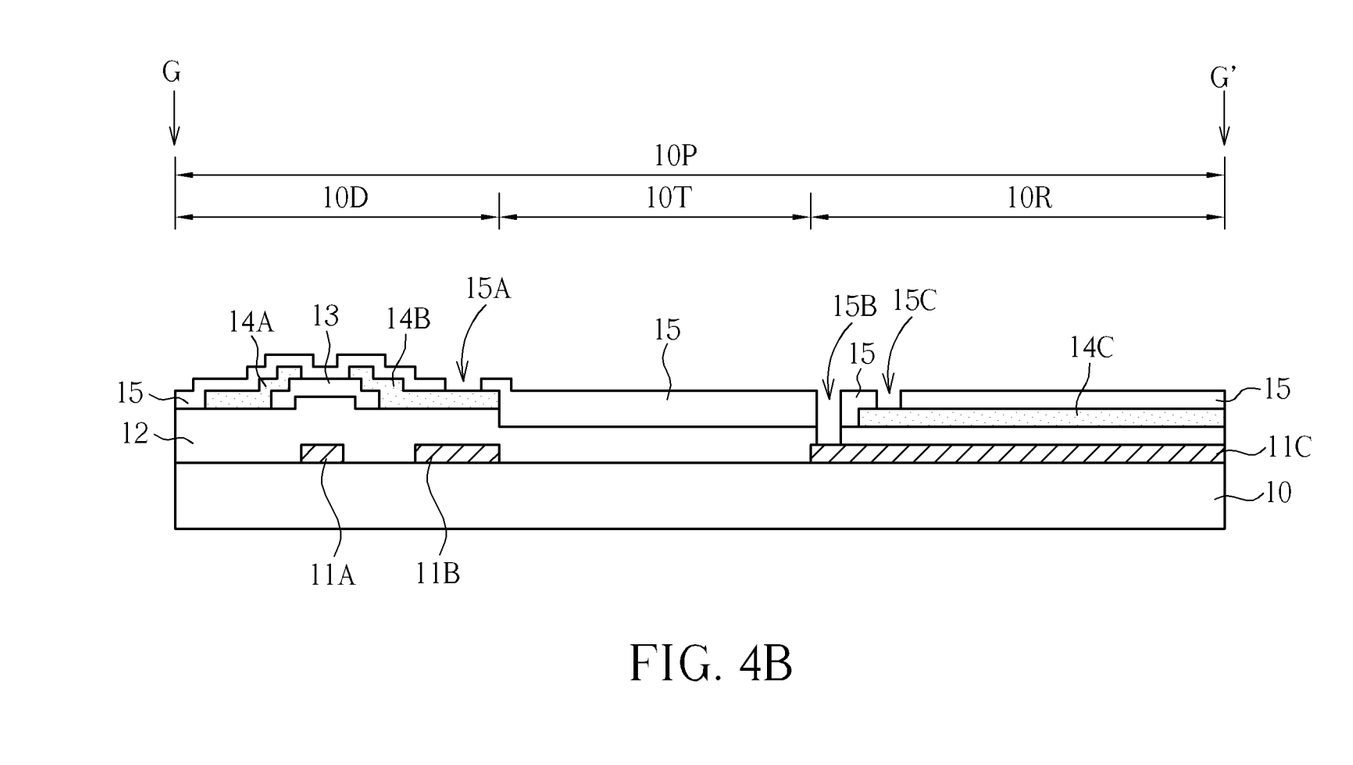

Please refer to FIG. 4A and FIG. 4B. FIG. 4A is a schematic diagram illustrating a top view of the preferred embodiment, and FIG. 4B is a schematic diagram illustrating a cross-sectional view along the line G-G' in FIG. 4A. As shown in FIG. 4A and FIG. 4B, a second insulating layer 15 is formed on the second patterned conductive layer and the first insulating layer 12. In addition, at least a first contact hole 15A is formed in the second insulating layer 15, at least a second contact hole 15B is formed in the second insulating layer 15 and the first insulating layer 12, and at least a third contact hole 15C is formed in the second insulating layer 15. The first contact hole 15A exposes a part of the drain electrode 14B, the second contact hole 15B exposes a part of the reflective electrode 11C, and the third contact hole 15C exposes a part of the patterned reflective layer 14C. A method of forming each of the contact holes employs a fourth photomask (not shown) in a photo etching process to make the contact holes, then the photoresist layer is removed in a stripping process.

Figure 5A:
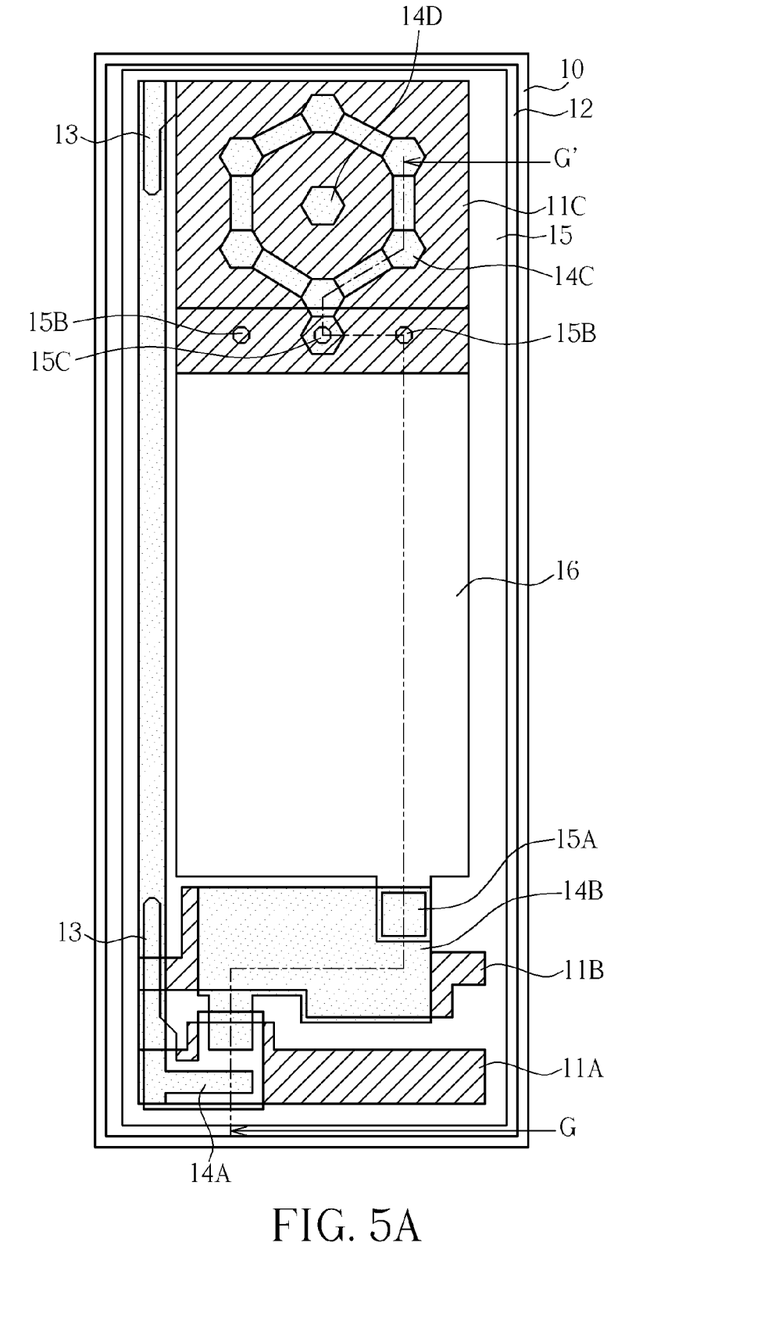
Figure 5B:
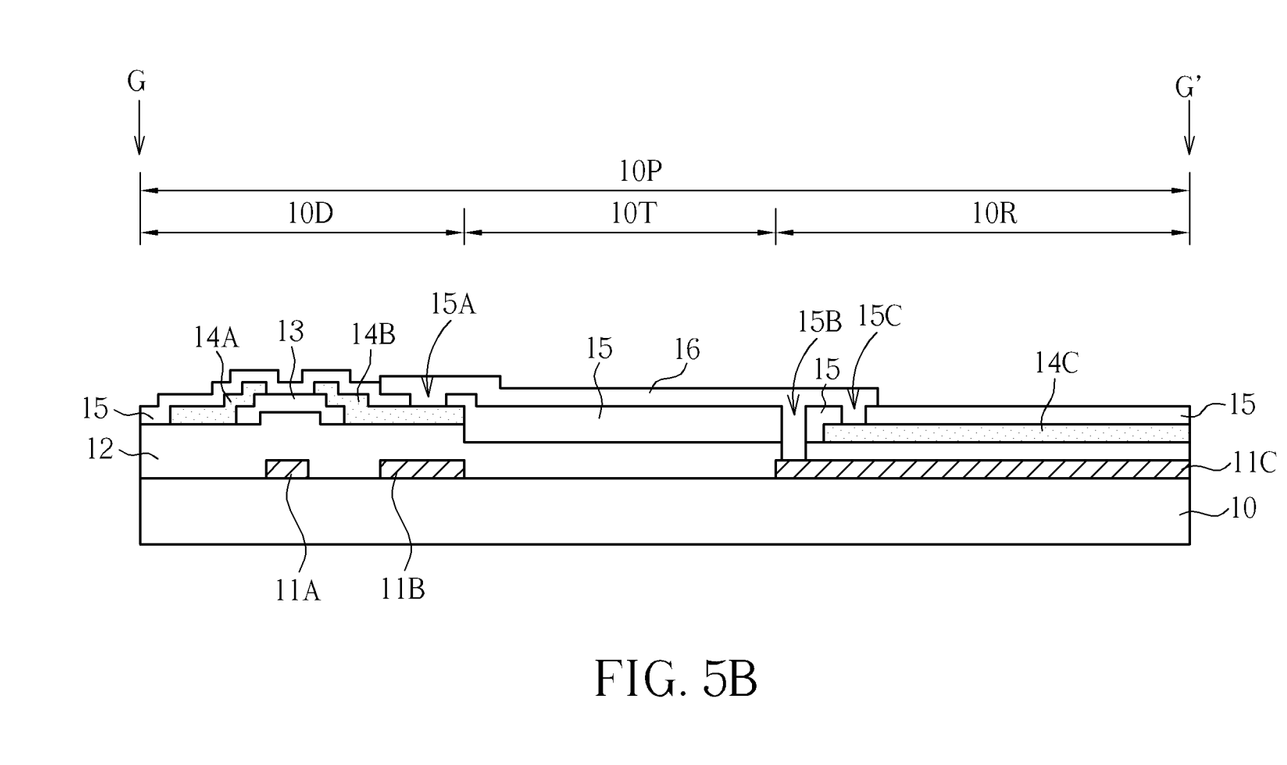

Please refer to FIG. 5A and FIG. 5B. FIG. 5A is a schematic diagram illustrating a top view of the preferred embodiment, and FIG. 5B is a schematic diagram illustrating a cross-sectional view along the line G-G' in FIG. 5A. As shown in FIG. 5A and FIG. 5B, at least a transmissive pixel electrode 16 is formed on the second insulating layer 15. The transmissive pixel electrode 16 is made of a transparent conductive material, such as indium tin oxide (ITO) or zinc oxide (ZnO). The transmissive pixel electrode 16 is disposed in the transmissive area 10T, in a part of the reflective area 10R, and in a part of the device area 10D, and the transmissive pixel electrode 16 is filled into the first contact hole 15A, the second contact hole 15B, and the third contact hole 15C, to be electrically connected respectively with the drain electrode 14B, the reflective electrode 11C, and the patterned reflective layer 14C. Additionally, a method of forming the transmissive pixel electrode 16 may comprise: depositing a third conductive layer (not shown) first, then employing a fifth photomask (not shown) in a photo etching process to pattern the third conductive layer, and forming the transmissive pixel electrode 16. The present invention is not limited to this, and other appropriate processes may be employed to form the transmissive pixel electrode.

Figure 6:
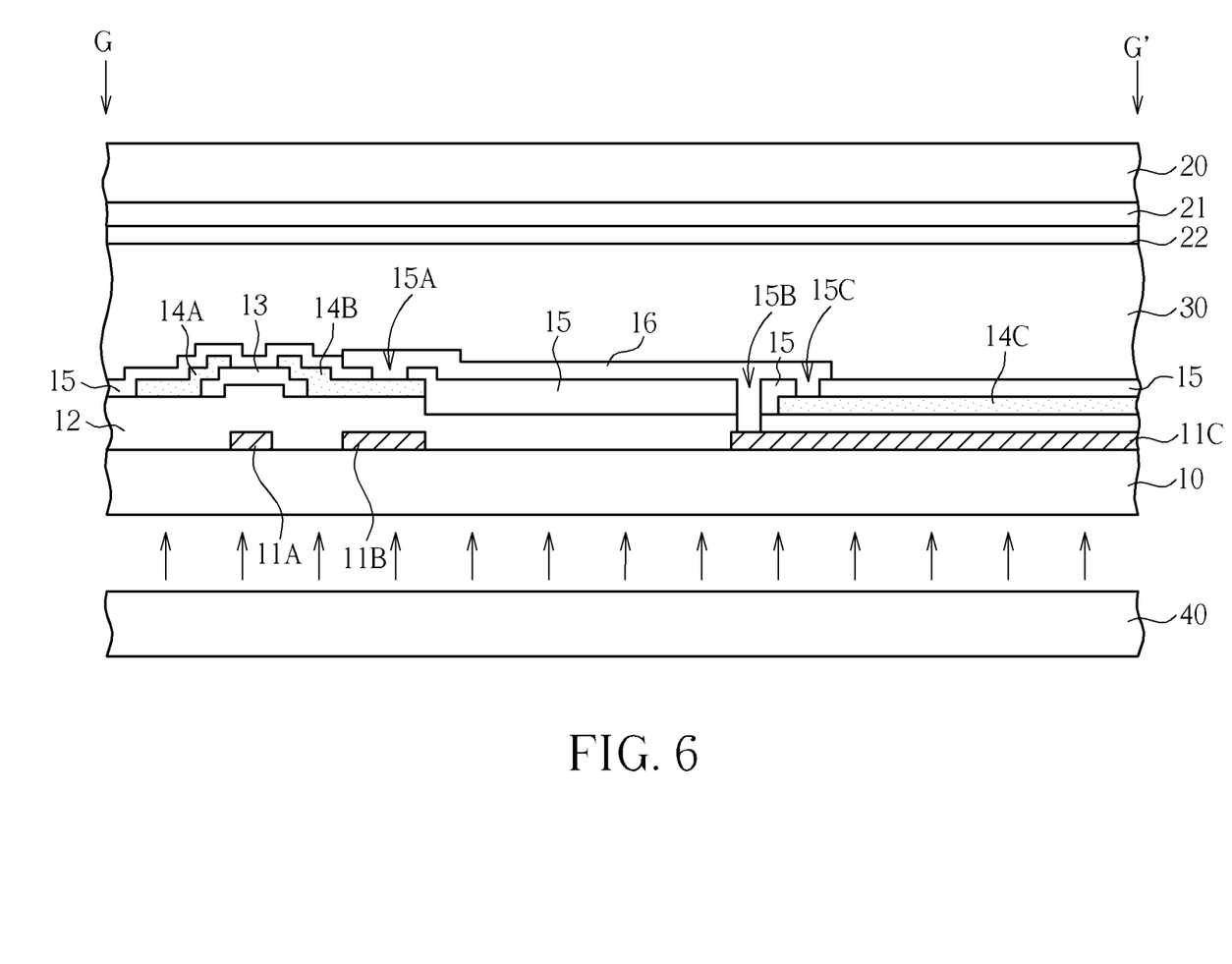

In addition, as shown in FIG. 6, the transflective liquid crystal display panel further comprises a color filter substrate 20, a color filter layer 21, a common electrode 22, a liquid crystal layer 30, and a backlight module 40. The color filter substrate 20 is disposed opposite the substrate 10. The color filter layer 21 and the common electrode 22 are disposed on the color filter substrate 20. Furthermore, the liquid crystal layer 30 is disposed between the color filter substrate 20 and the substrate 10, and the backlight module 40 is used to provide light for the transflective liquid crystal display panel to display pictures (as shown by arrows in FIG. 6).

According to the transflective liquid crystal display panel in the present invention, the reflection structure may be made using normal liquid crystal display panel manufacturing processes, and only five photomask processes are required without extra photomasks for making the reflection structure. The purposes of process simplification, yield enhancement, and manufacturing cost reduction may then be achieved. Furthermore, by using the two-layer reflection structure comprising reflective electrodes and the patterned reflective layer, the reflection effect may be obviously enhanced, and the usage ratio of ambient light may also be increased.

Those skilled in the art will readily observe that numerous modifications and alterations of the device and method may be made while retaining the teachings of the invention.

What is claimed is:

1. A transflective liquid crystal display panel, comprising:
   - a substrate, wherein the substrate comprises at least a pixel area, and the pixel area comprises a device area, a transmissive area, and a reflective area;
   - a first patterned conductive layer, disposed on the substrate, wherein the first patterned conductive layer comprises at least a gate electrode and a reflective electrode, the gate electrode is disposed in the device area, and the reflective electrode is disposed in the reflective area;
   - a first insulating layer, disposed on the first patterned conductive layer and the substrate;
   - a patterned semiconductor layer, disposed on the first insulating layer, wherein the patterned semiconductor layer substantially corresponds to the gate electrode;
   - a second patterned conductive layer, disposed on the first insulating layer and the patterned semiconductor layer, wherein the second patterned conductive layer comprises at least a source electrode, a drain electrode, and a patterned reflective layer, the source electrode and the drain electrode are disposed in the device area, and the patterned reflective layer is disposed in the reflective area, wherein the second patterned conductive layer further comprises at least an isolated bump disposed in the reflective area, and the isolated bump is not electrically connected with the patterned reflective layer;
   - a second insulating layer, disposed on the second patterned conductive layer and the first insulating layer, wherein the second insulating layer has a first contact hole to expose a part of the drain electrode, the second insulating layer and the first insulating layer have a second contact hole to expose a part of the reflective electrode, and the second insulating layer has a third contact hole to expose a part of the patterned reflective layer; and
   - at least a transmissive pixel electrode, disposed on the second insulating layer, wherein the transmissive pixel electrode is disposed in the transmissive area, in a part of the reflective area, and in a part of the device area, and the transmissive pixel electrode is filled into the first contact hole, the second contact hole, and the third contact hole, to be electrically connected respectively with the drain electrode, the reflective electrode, and the patterned reflective layer.

2. The transflective liquid crystal display panel in claim 1, wherein the patterned reflective layer includes a plurality of reflective bumps.

3. The transflective liquid crystal display panel in claim 2, wherein each of the reflective bumps is electrically connected with each other.

4. The transflective liquid crystal display panel in claim 1, wherein the first patterned conductive layer further comprises a storage capacitance electrode disposed in the device area.

\* \* \* \* \*